United States Patent
Tatsutomi et al.

[15] 3,685,295
[45] Aug. 22, 1972

[54] CONTROL SYSTEM FOR PURIFYING EXHAUST GAS OF AN INTERNAL COMBUSTION ENGINE

[72] Inventors: Yasuo Tatsutomi, Hiroshima; Tomoo Takokoro, Kure, both of Japan

[73] Assignee: Toyo Kogyo Company Limited, Hiroshima-ken, Japan

[22] Filed: March 10, 1970

[21] Appl. No.: 18,144

[30] Foreign Application Priority Data

March 10, 1969 Japan ................44/18204

[52] U.S. Cl. ..................60/290, 60/285, 123/117 A, 123/148 DS
[51] Int. Cl. ........F02b 75/10, F02p 5/08, F02p 15/02
[58] Field of Search.......60/30, 285, 290; 123/117 A, 123/117 R, 148 DS

[56] References Cited

UNITED STATES PATENTS

| | | | |
|---|---|---|---|
| 3,577,963 | 5/1971 | Bechmann | 123/117 A |
| 1,861,417 | 5/1932 | Klaiber | 123/146 A |
| 3,106,820 | 10/1963 | Schaffer | 60/30 |
| 3,272,191 | 9/1966 | Walker | 123/117 A |
| 3,397,534 | 8/1968 | Knowles | 60/30 |
| 3,426,737 | 2/1969 | Walker | 123/117 A |

OTHER PUBLICATIONS

Steinhagen et al., " Design and Development of the G. M. Air Injection Reactor System" Vehicle Emissions, Part II Soc. Auto. Engrs. Progress in Technology, Vol. 12, page 147.

*Primary Examiner*—Douglas Hart
*Attorney*—Sughrue, Rothwell, Mion, Zinn and Macpeak

[57] ABSTRACT

An air pump driven by the engine supplies secondary air through a conduit to the exhaust passage of the engine. The ignition system of the engine has the actuation of ignition means varied by delaying or cutting off ignition at low vehicle or engine speed but maintaining normal actuation of ignition means over a predetermined speed while supplying secondary air from the air pump to the exhaust passage within a predetermined low engine or vehicle speed but preventing the secondary air from reaching the exhaust passage above a predetermined speed.

5 Claims, 2 Drawing Figures

INVENTORS
YASUO TATSUTOMI
TOMOO TAKOKORO

BY Sughrue, Rothwell, Mion, Zinn & Macpeak

ATTORNEYS

CONTROL SYSTEM FOR PURIFYING EXHAUST GAS OF AN INTERNAL COMBUSTION ENGINE

BACKGROUND OF THE INVENTION

1. Field of the Invention

This invention relates to a system for removing detrimental components of unburned hydrocarbons and carbon monoxide contained in the exhaust gas of an internal combustion engine, and more particularly to an improved control system for purifying the exhaust gas by reburning the unburned components within a reactor carried by the exhaust passage by supplying secondary air into the exhaust passage or a reactor carried thereby and varying the actuation of ignition means of the engine.

2. Description of the Prior Art

Control systems of this type for purifying the exhaust gas of an internal combustion engine involve the connection of a reactor to the exhaust passage to which is supplied secondary air. Thus, unburned components of the exhaust gas are burned within the reactor at the same time that the actuation of ignition means is varied to improve the burning thereof. In such a case, for an internal combustion engine having two plugs, when the engine or vehicle speed is low, the actuation of ignition means of one of the multiple plugs thereof is delayed or cut off. In such an internal combustion engine having two plugs, delaying the ignition timing of either plug is effective to continue the combustion of the gas mixture into the exhaust pipe or reactor to thereby maintain the temperature of the interior of the exhaust pipe or reactor high and to burn any unburned components. Further, the cutting off of the ignition of either plug is also effective to burn the unburned components since the amount of unburned components of the exhaust gas introduced into the reactor from the exhaust port is increased sufficiently to provide an amount sufficient to be burned within the reactor. It follows, that if the unburned components of the exhaust gas to be introduced into the reactor from the exhaust passage are relatively small, these unburned components are not burned within the reactor but exhausted into the atmosphere. Even where the unburned components exhausted from the engine are relatively small, these unburned components may be higher than the amount allowed under existing law.

In the conventional control systems for purifying the exhaust gas as described heretofore, the secondary air is supplied during operation of the engine at all speeds. However, the detrimental components or unburned components of carbon monoxide and hydrocarbons in the exhaust gas are highest under engine idling operation or vehicle idling and decrease with increase in engine or vehicle speed and are least at the economic speed in which the combustion efficiency of the engine is highest, but over the normal economic speed of the engine, the percentage of detrimental components or unburned components increases again with increase in engine or vehicle speed. The amount of unburned components of the exhaust gas within a certain range of operation of the engine or range in vehicle speed is well within the allowable value restricted by present laws. Though, under high speed vehicle or engine operation, the amount of unburned components exceeds the allowable value, operation at high speed is non-existent within the cities in which the law is applicable, such operation normally occurring outside of town. Therefore, it is neither preferable nor necessary to supply secondary air to the reactor during all operational speeds of the vehicle or engine. As a result of experimentation, it is found that secondary air is unnecessary for the reactor over a predetermined engine or vehicle speed. Also, it is unnecessary to vary the actuation of ignition means of the spark plugs over the complete range of vehicle or engine speeds.

SUMMARY OF THE INVENTION

The present invention provides a control system for purifying exhaust gas which terminates the supply of secondary air to an exhaust passage and also maintains normal actuation of ignition means above a predetermined engine or vehicle speed. Particularly, the system of the present invention provides means for purifying the exhaust gas which improves the endurability of the reactor by terminating the supply of secondary air thereto above a predetermined engine or vehicle speed and at the same time improving the performance of the engine by varying the actuation of ignition means only within a predetermined minimum speed and maintaining it at a normal state above a predetermined speed so as to improve the combustion of the unburned components within the reactor.

The present invention is directed to a control system for purifying exhaust gas in an internal combustion engine having two plugs in which secondary air is supplied to the exhaust passage and at the same time the system delays or cuts off the actuation of ignition means of either plug below a predetermined speed and terminates the supply of secondary air to the exhaust passage and at the same time maintains both plugs at normal actuation of ignition means over and above a predetermined engine or vehicle speed.

DESCRIPTION OF PREFERRED EMBODIMENTS

Figure 1:
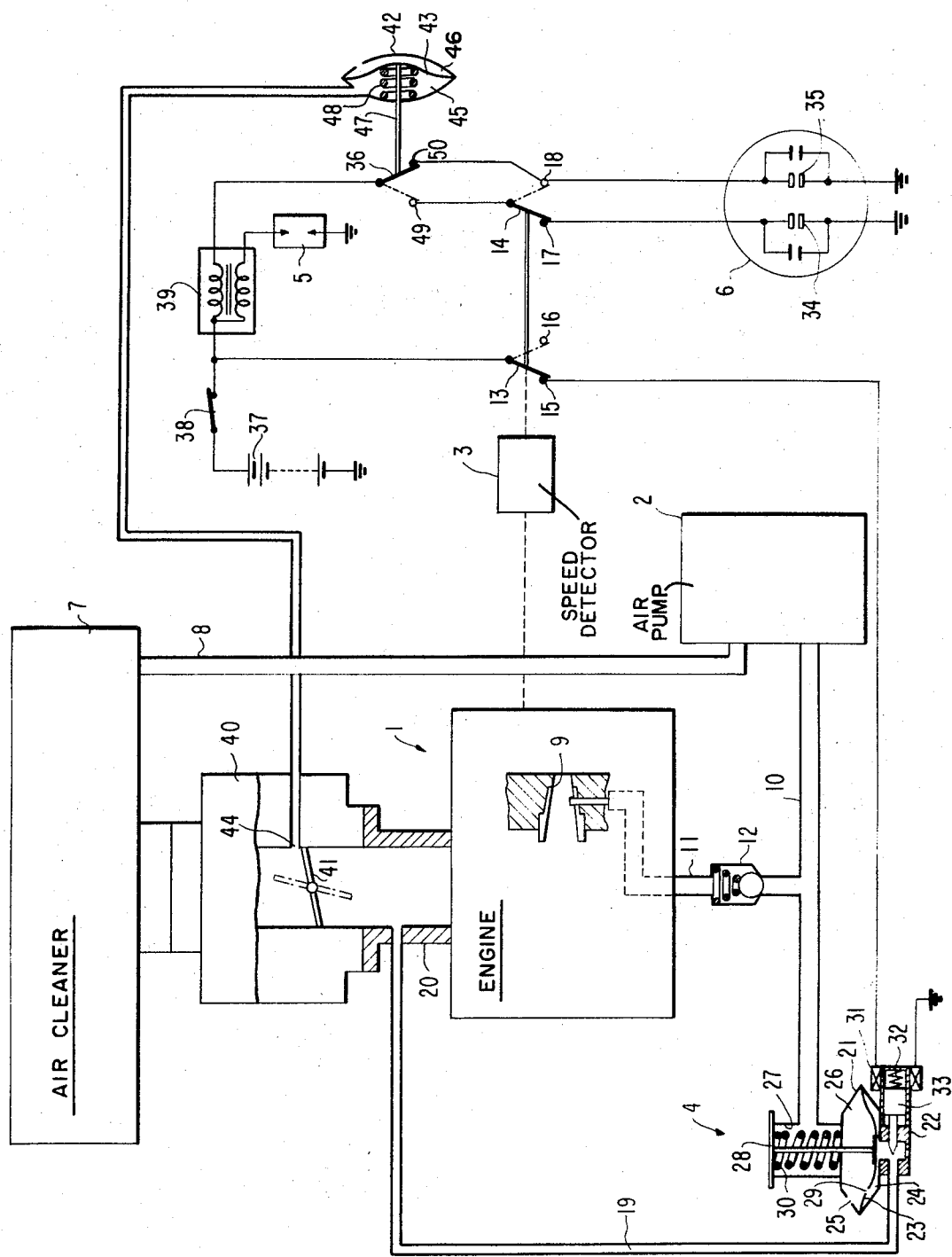
FIG. 1 is a schematic and partial electrical control circuit diagram of one embodiment of the exhaust gas purification system of the present invention.

Reference is now made to FIG. 1, which shows one embodiment of this invention.

The control system for purifying the exhaust gas of an internal combustion engine of the present invention incorporates an air pump 2 for supplying secondary air to an internal combustion engine 1. A speed detector 3 is employed for sensing engine speed. An air control device 4 controls the supply of air from air pump 2 to the engine 1, either maintaining the supply or shutting off the same. A distributor 6 is employed for varying the ignition timing of plug 5 under the control of speed detector 3.

The air pump 2 supplies the secondary air from the air cleaner 7 of the engine 1 through a conduit 8 with the discharge from air pump 2 passing through conduit 10 into an exhaust passage 9 of the engine 1. A check valve 12 is provided within conduit 10 to control the flow of secondary air through the branch conduit 11 to the exhaust passage 9. Thus, the check valve 12 allows the secondary air to flow from the air pump 2 into the exhaust passage 9, but prevents it from flowing in the opposite direction. The speed detector 3 simultaneously controls the position of a secondary air on-off switch 13 and an ignition timing varying switch 14, which is mechanically coupled to switch 13, at a predetermined speed of engine 1 which is identified schematically in block form. The secondary air on-off switch 13 is provided with stationary contacts 15 and 16 and maintains a circuit connection to contact 15 below a predetermined speed but switches to contact 16 above this predetermined speed. The ignition timing varying switch 14 is mechanically interlocked with the secondary air on-off switch 13 and is provided with stationary contacts 17 and 18. A circuit is completed through stationary contact 17 below a predetermined speed but the circuit is switched through contact 18 above a predetermined speed.

The air control device 4 comprises a vacuum motor 21 connected to a vacuum tube 19 to the air intake pipe 20 of engine 1. A solenoid valve 22 opens or closes the communication between the intake pipe 20 and the vacuum motor 21. The vacuum motor 21 incorporates a diaphragm 23 to divide the same into a vacuum chamber 24, to which a vacuum is introduced through the vacuum tube 19 and an air chamber 26, which communicates with the atmosphere through hole 25. The diaphragm 23 is mechanically coupled to a valve 28 which opens or closes hole 27 allowing communication of conduit 10 with the atmosphere. Diaphragm 23 carries a small hole 29 which allows communication between vacuum chamber 24 and air chamber 26 on the opposite side thereof. The valve 28 is biased by spring 30 so as to normally open hole 27 to the atmosphere.

The solenoid valve 22 includes a solenoid coil 31 which is electrically connected to stationary contact 15 of switch 13. The plunger 33 acting as the armature to move the same in a direction from left to right against a spring 32 which tends to close the valve, plunger 33 moving to the right upon energization of solenoid 31.

When the plunger 33 moves from left to right, communication exists between vacuum tube 19 and the vacuum chamber 24, and when the plunger 33 moves from right to left under the bias of spring 32, it shuts off communication between the vacuum tube 19 and vacuum chamber 24, which action occurs upon de-energization of solenoid 31.

The distributor 6 includes a delay side contact 34, which is electrically connected to stationary contact 17 of switch 14 and a normal side contact 35 which is connected to stationary contact 18 of the same switch. The delay side contact 34 forms an important component of the delay ignition circuit since it is connected to battery 37, ignition switch 38, ignition coil 39 and plug 5, only when the movable idling control switch 36 is in contact with stationary contact 49 as illustrated by the broken line at the same time that switch 14 is in the position shown by the solid line completing the circuit to stationary contact 17. Further, the normal side contact 35 forms a normal ignition circuit when switch 14 and control switch 36 are both in the positions identified by the broken lines in the drawings or control switch 36 is in the position identified by the solid line in the drawing.

The idling control switch 36 is connected to a vacuum motor 42 which operates through the vacuum pressure of carburetor 40. The vacuum motor 42 includes a vacuum chamber 45 communicating with vacuum inlet hole 44 of carburetor 40 and an air chamber 46 which communicates with the atmosphere on the opposite side of diaphragm 43. The diaphragm 43 is mechanically coupled by rod 47 to the movable switch 36. A spring 48 tends to maintain diaphragm 43 in the right hand position, but under the application of vacuum pressure within vacuum chamber 45, the rod shifts the switch 36 from stationary contact 50 to stationary contact 49. The vacuum inlet hole 44 is disposed upstream of the throttle valve 41 when the throttle valve is fully closed but is so disposed within the wall of the carburetor that it lies downstream of the throttle valve 41 when the throttle valve is slightly open. Accordingly, the switch 36 is connected to contact 50 by rod 47 moving from left to right under the compression of spring 48 because the atmospheric pressure acts through the vacuum inlet hole 44 when the throttle valve is fully closed under idling operation. However, when vacuum is introduced into the vacuum chamber when the throttle valve opens to a certain extent, switch 36 moves to the dotted line position shown making contact with stationary contact 49.

In operation of the above identified system, when the ignition switch 38 is closed, and the engine 1 is running below a predetermined speed, the throttle valve 41 of carburetor 40 is closed and all of the control components are in the state shown by solid lines in FIG. 1. The secondary air on-off switch 13 is connected to stationary contact 15 so that the solenoid valve 22 is energized with result that the plunger 33 is moved from left to right against the spring 32 to open the passage between the vacuum tube 19 and the vacuum chamber 24. The diaphragm 23 of the vacuum motor 21 is sucked downwardly in the drawing by the vacuum introduced into vacuum chamber 24 to close valve 28 against the compression of spring 30 so that it prevents communication between hole 27 and the atmosphere 10. Accordingly, the secondary air being supplied by air pump 2 passes through conduit 10, unseating check valve 12 and passing through branch tube 11 into exhaust passage 9. Switch 14 completes a circuit through stationary contact 17 but since the throttle valve 41 is closed and the idling control switch 36 completes a circuit through stationary contact 50, the ignition timing of plug 5 is under the normal state. Thus, at relatively low speed the system is not effective to decrease the detrimental components in the exhaust gas but is effective to maintain the idling operation of the engine relatively smooth. Even though the engine speed is below a predetermined speed, the ignition timing of plug 5 is maintained at its normal state. In this case, since the secondary air is supplied from air pump 2 into the exhaust passage 9 of the engine, even if the ignition timing of the plug 5 is kept normal, the removal of detrimental components in the exhaust gas is not greatly effected. However, if the ignition timing is delayed, it becomes much more effective so as to readily decrease the detrimental components in the exhaust gas, but in applying the control system for purifying the exhaust gas to the internal combustion engine, it is also necessary to decrease the detrimental components in the exhaust gas below the allowable value stipulated by local law without lowering the performance of the internal combustion engine below a predetermined level.

When an operator depresses the accelerator pedal from the engine idling operation so as to open the throttle 41, engine speed will increase over idling speed. In this case, since the throttle valve 41 is open to the extent necessary to generate a vacuum pressure in the neighborhood of vacuum inlet hole 44, the vacuum motor 42 will operate under the vacuum pressure to connect the switch 36 through rod 47 to stationary contact 49 that is shifting the switch 36 from right to left. This completes a delay ignition circuit and the combustion of the gas mixture taken into the engine continues to the exhaust pipe or reactor (not shown) with the result that the temperature within the exhaust pipe or reactor increases to the extent that the unburned components in the exhaust gas are effectively burned by the cooperating action of the secondary air supplied to the exhaust passage 9. When engine speed increased over a predetermined speed, the combustion efficiency of the engine 1 becomes very effective so that the amount of detrimental components in the exhaust gas decreases below the allowable value with the result that switches 13 and 14 now move from contacts 15 and 17 respectively to contacts 16 and 18. The solenoid coil 31 of solenoid valve is de-energized, and the plunger 33 moves from right to left under the bias of spring 32 so as to prevent the vacuum tube 19 from communicating to the vacuum chamber 24. Thereafter, atmospheric pressure is introduced through small hole 29 from the air chamber 26 to the vacuum chamber 24 to reduce the pressure difference between air chamber 26 and vacuum chamber 24 to zero with the result that the valve 28 moves upwardly under the tension of spring 30 to thus communicate hole 27 with the atmosphere. Now, secondary air being supplied from air pump 2 is introduced through conduit 10 and hole 27 to the atmosphere rather than passing through branch conduit 11 to the exhaust passage 9. The pressure within conduit 10 lowers sufficiently so that the coil spring closes check valve 12.

Secondary air ceases to be supplied to the exhaust passage 9 at the same time that the normal ignition circuit is formed by switching of switch 14 to complete a circuit through stationary contact 18 so that the timing of plug 5 is now at its normal ignition state.

As seen from the foregoing description, if engine speed increases over a predetermined speed, secondary air is no longer supplied to the exhaust passage 9 and simultaneously the ignition timing of plug 5 returns to its normal state. If secondary air is not supplied to the exhaust passage 9, the temperature within the exhaust tube or pipe and reactor is lowered with the result that its durability is improved. Further, if ignition timing returns to the normal state from the delayed state, the performance of the engine is also improved.

In this case, the detrimental components contained in the exhaust gas decrease from the idling state of the engine toward operation of the engine at its most economic speed, that is, at speeds above idling, but if the engine speed increases excessively over that operating most economically, there is again an increase in the detrimental components contained in the exhaust gas. However, since the engine normally does not operate at such a high speed except in the suburbs or in the country, the system of the present invention may be readily simplified to increase its reliability by the simplified means of cessation of the supply of secondary air and by termination in the variation of ignition timing, in particular, a timing delay for all speeds above a particular engine speed.

Figure 2:
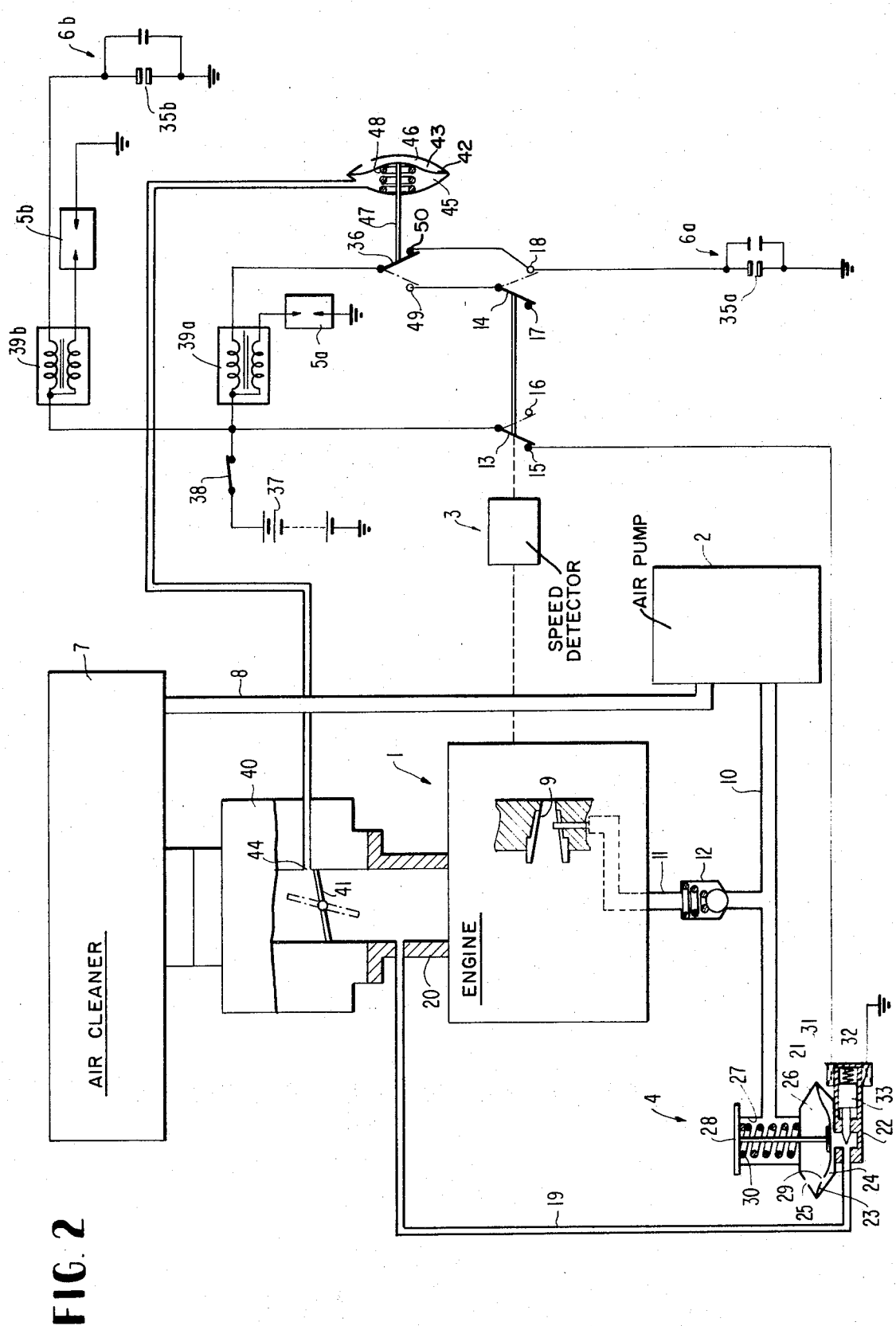
FIG. 2 is a schematic, and partial electrical circuit diagram of a second embodiment of the present invention.

Referring next to FIG. 2, there is shown another embodiment of the present invention in which the ignition system employs two plugs 5a and 5b for the internal combustion engine. Here, like parts and components carry the same reference numerals as those in FIG. 1. The two plugs 5a and 5b are connected to contacts 35a and 35b, respectively, of distributors 6a and 6b and are set so as to control the ignition timing to the best engine performance when the ignition circuit is electrically completed. The contact 35a may be connected or disconnected from ignition coil 39a by switch 14 and idling control switch 36. The switch 14 is in position to complete an electrical circuit through contact 17 below a predetermined speed for engine 1, but moves to complete a circuit through contact 18 in response to detection of engine speed above the predetermined speed by speed detector 3. Switch 36 is controlled by vacuum motor 42 so as to switch in similar fashion to the first embodiment. The plug 5a is not fired below a predetermined speed, except when the engine is running at an excessively slow idling speed, and then is prevented from firing except when the engine operates above a predetermined speed much higher than the idling speed. The plug 5b is always firing regardless of engine speed.

In this particular embodiment of the invention, during initial engine startup, all controlling elements are in the state illustrated by the solid lines in FIG. 2, insofar as the switches are concerned and upon idling operation of engine 1. During idling, the secondary air from the air pump 2 is supplied to the exhaust passage 9 at the same time that the two plugs 5a and 5b are ignited together.

The secondary air is supplied to the exhaust passage 9 when the engine is operating below a predetermined speed and with the exception of idling operation, at the same time switch 36 is connected via contact 49 to switch 14, and switch 14 completes an electrical circuit to contact 17 so that plug 5a is cut off from its ignition circuit. Accordingly, the unburned components in the exhaust gas passing through the exhaust passage 9 increases, and these are burned in the exhaust pipe or reactor under such conditions. It follows that the larger the ratio of the unburned components in the exhaust gas, the faster the gas is burned.

Over a predetermined engine speed, the switches 13 and 14 are moved to the dotted line position illustrated in the drawing so that the secondary air is no longer supplied to the exhaust passage 9, and at the same time both plugs 5a and 5b are fired simultaneously. Accordingly, the second embodiment improves the durability of the reactor in a similar fashion to the first embodiment while also improving the performance of the engine 1.

It is clearly understood from the foregoing description that in the first and second embodiments illustrated in FIGS. 1 and 2, respectively, secondary air is supplied to the exhaust passage and at the same the ignition timing of the plug is substantially varied at low speed except during idling of the engine, and a supply of the secondary air to the exhaust passage ceases and at the same time the ignition timing is maintained at the normal state over a predetermined economical speed, and the decrease of the unburned components of the exhaust gas is maintained below the allowable value and yet the durability of the exhaust pipe and the reactor and the performance of the engine are improved.

In the aforementioned embodiments, both the control of the secondary air supply and ignition timing is achieved by means detecting engine speed but in the various control means may be readily controlled by detection of vehicle speed rather than engine speed with the same results. Accordingly, this invention is not intended to be limited to a system under control by detection of engine speed.

What is claimed is:

1. A control system for purifying exhaust gas of an internal combustion engine comprising in combination:
   a. an exhaust passage;
   b. conduit means for delivering secondary air to said exhaust passage;
   c. ignition means for said engine;
   d. means capable of varying the actuation of said ignition means;
   e. means carried by said conduit means for allowing secondary air to be supplied to the exhaust passage below a predetermined engine speed and for preventing secondary air from reaching the exhaust passage above said predetermined speed;
   f. ignition timing control means for substantially varying the actuation of said ignition means at engine speeds below said predetermined engine speed and for maintaining normal actuation of said ignition means above said predetermined speed, wherein said ignition timing control means includes an engine speed responsive switch and wherein said engine includes a distributor having normal ignition timing contacts and delayed ignition timing contacts, and wherein said engine speed responsive switch acts to connect said delayed ignition timing contacts to said ignition means at speeds below said predetermined engine speed and to connect said normal ignition timing contacts to said ignition means at speeds above said predetermined engine speed; and
   g. means responsive to the idling operation of said engine for maintaining said ignition timing at the engine's normal state regardless of the operation of said ignition timing control means.

2. The control system as claimed in claim 1 wherein said means for maintaining normal ignition timing regardless of operation of said ignition timing control means during idling operation of the engine comprises a vacuum pressure switch fluid coupled to said engine carburetor intake wherein said vacuum pressure switch includes a multiple position switch mechanically coupled to a vacuum motor, whereby, during engine idling the pressure signal to said vacuum switch maintains an ignition circuit through said normal ignition contacts.

3. A control system for purifying exhaust gas for internal combustion engines comprising in combination:
   a. an exhaust passage;
   b. conduit means for delivering secondary air to said exhaust passage;
   c. ignition means for said engine including a distributor having delayed ignition timing contacts and normal ignition timing contacts;
   d. means capable of varying the actuation of said ignition timing means;
   e. means carried by said conduit means for allowing secondary air to be supplied to the exhaust passage below a predetermined engine speed and for preventing secondary air from reaching the exhaust passage above a predetermined speed;
   f. ignition timing control means for substantially varying the actuation of said ignition means at engine speeds below said predetermined engine speed and for maintaining normal actuation of said ignition means above said predetermined speed; and
   g. means for completing an ignition circuit through said delayed ignition timing contacts when said engine operates below said predetermined speed and means for completing an ignition circuit through said normal ignition timing contacts when said engine operates above said predetermined speed.

4. A control system for purifying exhaust gas of an internal combustion engine comprising in combination:
   a. an exhaust passage;
   b. conduit means for delivering secondary air to said exhaust passage;
   c. ignition means for said engine including first and second ignition plugs;
   d. means capable of varying the actuation of said ignition means;
   e. means carried by said conduit means for allowing secondary air to be supplied to the exhaust passage below a predetermined engine speed and for preventing secondary air from reaching the exhaust passage above said predetermined speed; and
   f. ignition timing control means for substantially varying the actuation of said ignition means at engine speeds below said predetermined engine speed and for maintaining normal actuation of said ignition means above said predetermined speed, said ignition timing control means including means for terminating the firing of said first plug after said engine reaches a predetermined speed and for maintaining the firing of said second plug throughout the range of engine speeds.

5 A control system for purifying exhaust gas for an internal combustion engine comprising in combination:
   a. an exhaust passage;
   b. conduit means for delivering secondary air to said exhaust passage;
   c. ignition means for said engine including first and second ignition plugs;
   d. means capable of varying the actuation of said ignition means;
   e. means carried by said conduit means for allowing secondary air to be supplied to the exhaust passage below a pre-determined engine speed and for preventing secondary air from reaching the exhaust passage above said predetermined speed;
   f. ignition timing control means for substantially varying the actuation of said engine means at engine speeds below said predetermined engine speed and for maintaining normal actuation of said ignition means above said predetermined speed, said ignition timing control means including means for terminating firing of said first plug after said engine reaches said predetermined speed and for maintaining firing of said second plug throughout the operation of said engine; and g. means responsive to the idling operation of said engine for maintaining said ignition timing at the engine's normal state regardless of the operation of said ignition timing control means.

* * * * *